Patented Aug. 8, 1933

1,921,375

UNITED STATES PATENT OFFICE 1,921,375

VULCANIZING RUBBER

George H. Stevens, Newark, N. J.

No Drawing. Application July 16, 1923
Serial No. 651,968

15 Claims. (Cl. 18—53)

This invention relates to improvements in the use of organic, nitrogeneous, substances that assist in or accelerate the vulcanization of rubber, and has for its object the utilization of new reactions and products to this end.

This specification forms a continuation in part of an application filed July 30, 1920 as Ser. No. 399,979 and issued in part Aug. 21, 1923 as No. 1,465,743 and brings forward products disclosed in the earlier specification as originally filed, but which were not printed in the patent that finally issued.

This specification is also a continuation in part of Ser. No. 647,765 filed June 25, 1923, wherein is set forth the subject matter of mono- and di-substituted carbodiimide, derivatives of carbodiimide, and the phenyl, tolyl and xylil substituted products of carbodiimide, and derivatives thereof, filed co-pending with 399,979.

Divisions of 647,765 already issued are 1,559,-196; 1,559,197; 1,559,198; and parts still pending are Ser. Nos. 58,460 and 59,726 that relate to the tolyl derivatives.

The action of organic, nitrogenous, compounds in aiding the vulcanization of rubber is of such a complex character and explained by such varied theories of acceleration that one hesitates to accept any of these theories as correct, but the results of an accelerated vulcanization, or a suitable cutting down of the time and temperature employed in effecting it, is most important, and whether the theory is right or wrong if the result proves of worth, then the art is benefitted thereby and the error in theory is easily overlooked.

This situation in the art then is productive of numerous expedients, and many ways of using organic, nitrogenous, bodies to aid and accelerate rubber vulcanization.

This invention makes use of two separate series of substituted guanidines, that respectively are so structurally constituted, that if a member of both series is used in combination, either in the form of a solid solution or as a mere mixture, or if the component products of the respective members are used in combination as an equivalent, that a more effective acceleration results therefrom, than when either of the guanidines are used alone, and the phenyl, tolyl, xylil, or homologously substituted carbodiimides set forth in 647,765 constitute the main components from which the corresponding substituted guanidines of these two series are derived, as well as all their combinations.

Undoubtedly the decomposition products formed from the accelerator during vulcanization, play a most important part.

Triphenylguanidine ($C_{19}H_{17}N_3$) has been known for a long time as an accelerator, but the results obtained from the use of it are not equal to that of many other accelerators that are just as available for use, and while it has over 14% of nitrogen it still fails to rate with the best of them. Its melting point too is higher than it should be for marked activity in vulcanization.

In a previous patent application, filed by me on July 30, 1920, I mention monophenylguanidine ($C_7H_9N_3$) as a rubber accelerator, having a nitrogen content of 31%.

Here then were two nitrogenous, organic bodies, more or less related in their chemical structure, and an examination of their properties and decomposition products showed that the most natural and logical thing to do would be to combine them, and find properties present then, that were more conducive to effecting a marked acceleration in vulcanization than were found when either was used alone.

Monophenylguanidine has a melting point of 66° C. and a nitrogen content of 31%, while the melting point of triphenylguanidine is 143° C. and the nitrogen content 14.6%. The former is quite hygroscopic and soluble in water. The latter is practically non-hygroscopic and only slightly soluble in water.

Monophenylguanidine decomposes readily at a temperature a little above its melting point (M. P. 66° C.) and in so doing splits off ammonia, with carbomonophenylimide, or its equivalent (phenylcyanamide, cyanilide, $C_7H_6N_2$) as the main decomposition product, of very low melting point, and readily polymerizable to a much higher M. P.

Triphenylguanidine, while it does not decompose at as low a temperature as the monophenylguanidine, nevertheless decomposes readily at vulcanizing temperatures and splits off aniline, with its main decomposition product as carbodiphenylimide or its equivalent (diphenylcyanamide, $C_{13}H_{10}N_2$), also of very low melting point and readily polymerizable to a much higher M. P.

Carbomonophenylimide and carbodiphenylimide are both of them very reactive bodies and especially so in the presence of the other decomposition products that are naturally present with them.

They will combine with each other in more than one molecular proportion, each will combine with either aniline or ammonia, and either will combine with more than one phenylguanidine.

Both carbomonophenylimide and carbodiphenylimide form polymerization products which also are more or less reactive with the same bodies as their lower polymers.

The aniline and ammonia released with these two carbophenylimides is also reactive with more than one of the phenylguanidines.

In the reactions then that follow, from a combination of monophenylguanidine and triphenylguanidine under vulcanization, and with a metallic oxide present, the result would appear to be largely as follows:

Decomposition of the monophenylguanidine into carbomonophenylimide and ammonia.

Decomposition of the triphenylguanidine into carbodiphenylimide and aniline.

Combination of carbodiphenylimide with the nascent ammonia to diphenylguanidine, and probable combination of some of the carbomonophenylimide and nascent aniline to diphenylguanidine.

Nascent diphenylguanidine (supposedly far more active than free diphenylguanidine) might largely be the first product formed, though substantially only as an intermediate product, but subject to the same general trend of decomposition as any diphenylguanidine.

This normal decomposition of diphenylguanidine is authoritatively agreed upon as: First splitting up into carbomonophenylimide and aniline, and then carbodiphenylimide and ammonia being formed.

The carbomonophenylimide first released probably unites gradually with the aniline to produce carbodiphenylimide, just as monophenylurea unites with aniline to produce diphenylurea (Weith, Ber. 9, 821), though the formation of the carbodiphenylimide is explained by early authorities as an entirely separate decomposition.

Recombination of some of the carbo-phenylimides with the nascent aniline, and with the nascent ammonia, may again produce guanidines, but these in turn would decompose again until the gradual combination of the carbo-phenylimides with each other, would slowly eliminate them, and the dissipation of the aniline and ammonia would more rapidly eliminate them and the products that remain then would appear to be largely, unchanged phenylguanidine, uncombined carbo-phenylimides, and the carbo-phenylimide combination products, substantially tetraphenylmelamine, that possesses a melting point above the products started with and of considerable stability.

In vulcanization then, this would indicate an early activity of the accelerator composed of monophenylguanidine and triphenylguanidine while the numerous reactions were taking place and aniline and ammonia were being released, then a reaction stage where the carbo-phenylimides were forming new products, and then an ultimate stage where the progressive reactions were accumulating the higher melting bodies in place of the lower melting bodies started with.

These stages of reaction however are not to be understood as distinctly separate but are periods where the stated reactions predominate. Such an accelerated vulcanization would appear then to promise less activity of the vulcanizing constituents of the rubber after vulcanization than is found with accelerators that decompose into lower melting bodies and generally of less stability.

That is, in the first case the vulcanized rubber has "better aging qualities", or "stands aging better", than in the second case.

Much difference of opinion exists as to what these ultimate bodies really are, for varying temperatures of vulcanization and different vapor pressures to which a vulcanization may be subjected may somewhat change the order of decomposition of the mono- and tri-phenylguanidines and also change the speed of dissipation of the aniline or the ammonia, or even change the order of recombination of these products, but all of these reactions take place substantially between but four important constituents, namely: carbomonophenylimide, carbodiphenylimide, aniline and ammonia.

It is plainly evident then that largely the same end will be attained in any of these reactions, and that variations in temperature and pressure must influence more the degree of such ultimate conversion than it does the production of compounds other than would normally occur, and that ultimately tetraphenylmelamine (tetraphenyltricarbodiimide $C_{27}H_{22}N_6$) progressively constitutes apparently a substantial part.

This body has a M. P. of 217° C., is very stable at temperatures below its melting point and appears to be very inactive when not combined with its other related bodies, and in substituting the accelerators started with, because of this high melting point, greatly inhibits further vulcanization in the cold, that is allows the rubber to stand "aging better".

An illustration of the formation of tetraphenylmelamine is 2 molecules of carbomonophenylimide and 1 molecule of carbodiphenylimide. (Ann. 1850, 74, 6; Ber. 1874, 7, 1736; Ber. 1875, 8, 912; Monatsh. 1877, 403; Ber. 1887, 20, 1065.)

However, a single molecule of each may react to triphenyldicarbimide ($C_{20}H_{16}N_4$) (M. P. 70–74° C.) (Ber. 1887, 20, 1065), but with an excess of carbomonophenylimide present later, the triphenyldicarbimide may readily revert to tetraphenylmelamine.

Should diphenylguanidine ($C_{13}H_{13}N_3$) form in the reactions as an intermediate reaction, as by a combination of the carbomonophenylimide and aniline, or a combination of the carbodiphenylimide and ammonia, or of the triphenylguanidine and ammonia, then the carbomonophenylimide, or its equalent (phenylcyanamide) may combine with the diphenylguanidine to form triphenylbiguanide ($C_{20}H_{19}N_5$, Ber. 1890, 23, 1668), and Scott claims carbodiphenylimide and the diphenylguanidine can combine to form tetraphenylbiguanide ($C_{26}H_{23}N_5$, J. I. E. C. 1923, 15, 286).

Triphenylbiguanide has a M. P. of 137° C., and tetraphenylbiguanide has a M. P. of 136° C.

However, since the presence of metallic oxides in vulcanization cause decomposition of an organic accelerator at temperatures much lower than would normally cause it to decompose, and as diphenylguanidine melting at 147° C. must itself first be decomposed to some extent to furnish the necessary constituents for a combination of the carbo-phenylimides with the diphenylguanidine to produce the biguanides mentioned, and as these two biguanides have melting points even lower than the diphenylguanidine, then this same vulcanizing temperature that might be responsible for their formation cannot fail to largely break them up again, substantially as fast as they may form.

These phenylbiguanides under vulcanizing temperatures and conditions readily release their added molecule of carbophenylimide, and then the diphenylguanidine portion gives up first its aniline in the regular way. If the triphenylbiguanide should split off ammonia instead, it would merely leave triphenyldicarbimide that would then soon revert to tetraphenylmelamine.

If the tetraphenylbiguanide should split off aniline instead it would merely leave triphenyldicarbimide that in turn would soon become tetraphenylmelamine.

Adding 2 molecules of carbomonophenylimide to the tetraphenylbiguanide would result in tetraphenylmelamine direct.

In a like manner triphenyldicarbimide (M. P. 70° C.), if present at any time, is either quickly decomposed, or forms an addition product with another molecule of carbomonophenylimide, and thus results in tetraphenylmelamine.

In the event that the presence of moisture in these reactions should cause a molecule of water to unite with the carbo-phenylimides to form corresponding phenylureas, these may to a substantial extent recombine again with the nascent aniline, or with the nascent ammonia, splitting off their water, and then follow the same normal path as the rest, namely to tetraphenylmelamine.

Many of these reactions are reversible, and the temperatures that cause the combinations also cause in turn again their separation.

It is apparent then that triphenyldicarbimide, triphenylbiguanide, and tetraphenylbiguanide, if they do form at all, are the result of intermediate reactions largely, and play no important part to the detriment of the formation of the ultimate end product tetraphenylmelamine which is not so subject to these reverse reactions or to so ready a decomposition. They may delay the reaction, or reduce the amount of end product, but do not prevent its being formed.

Should these guanidines, or their disassociation products, during vulcanization, form combinations with the sulphur, or with any of the other usual compounding constituents, it would appear to be largely as catalysts, and rejuvenation of any of them, or of any of their decomposition products later, would permit the normal reactions to continue. That such reactions do continue has authoritative support, as well as being observable in general practice (Ostromuislensky, Jour. Russ. Phys. Chem. Soc., 47, 1892—8, 1915).

Monophenylguanidine and triphenylguanidine themselves do not appear to be at all antagonistic to each other.

Their decomposition products too would seem, from the foregoing reactions, to not be antagonistic to each other but rather as very suitable to effect an accelerated vulcanization during their greatest chemical activity, and then be followed by a quiescence when vulcanization is about completed or at an end.

Varying the percents of the two phenyl-guanidines employed, of course causes a variation in the quantity of the respective carbo-phenylimides liberated, which in turn would probably govern to a considerable extent the production of the high melting resultant body that would be formed.

The foregoing relates to the two phenylated guanidines mentioned and to their decomposition products.

However, much the same series of reactions seem to also take place between the two tolyl- and between the two xylil-substituted guanidines homologous to these two phenylated guanidines.

While aniline enters into the production of the phenyl-guanidines mentioned, and is also a decomposition product of them as well, in a like manner the homologues of aniline namely toluidine and xylidine bear a similar relation to the corresponding tolyl- and xylil-guanidines respectively, and are as frequently present with them.

Aniline and these homologues of aniline, in their chemical activity however, are not necessarily confined to reactions within their own group, for if they be present in a different group they may also cause reactions that result in the compounds containing both of such homologous radicals, as where combination is made between a mono-substituted-guanidine and a tri-substituted-guanidine, each of which might contain a different homologous radical.

Such combinations might be especially desirable, so that a low melting mono-substituted-guanidine could bring down the M. P. of a high melting tri-substituted-guanidine or vice versa, as a mixture, or in the form of a solid solution, and thus allow both to accelerate vulcanization at their maximum efficiency.

In my investigation of that series of compounds, of which the several examples have been mentioned, I have found that such mixtures of mono-substituted-guanidine and tri-substituted-guanidine, or of their decomposition products, do prove of unusual value in accelerating rubber vulcanization.

Monophenylguanidine is readily made by desulphurizing monophenylthiurea in the presence of ammonia (Ber. 1879, 12, 1602).

It is also made by combining carbophenylimide and ammonia (Beilstein, 1883, II, 920).

Another way of producing it is from cyanamide (carbodiimide) and aniline hydrochloride (Am. Chem. Jnl. 1901, 26; 221; Ber. 1904, 37, 1681; Richter, 1922, II, 104).

Monophenylguanidine is also a decomposition product of phenylbiguanide (Monatsh. 1891; 12, 17).

The most convenient way to make triphenylguanidine is to desulphurize diphenylthiurea (thiocarbanilide) with litharge in the presence of aniline. This process is one in quite general commercial use.

A desulphurization of mono- or di-phenylthiurea also gives the same carbo-phenyl-imide, as does the decomposition of the corresponding mono- or triphenyl-guanidine.

A combination then of these two phenyl-guanidines may be readily effected and in several ways.

One manner of preparing this mixed phenyl guanidine accelerator is to use molecular proportions, and take twice the molecular proportion of the lower melting or mono-phenylguanidine, and one molecular proportion of the higher melting or triphenylguanidine.

Reduced to specific quantities the proportions would be, about 15 lbs. of monophenylguanidine and 16 lbs. of triphenylguanidine.

The nitrogen content of the mixture then would be a little above 25% which would be rated very high in a suitable accelerator.

Should molecular proportion of the mono- and tri-phenylguanidines be used, theoretically no aniline or ammonia would be left over and an equal weight of nascent diphenylguanidine would theoretically result as the first combination products of the disassociation. The nitrogen content would then be over 19%.

As a large quantity of the low melting monophenylguanidine (66° C.) might lower the M. P. of the combined product to such an extent as to possibly interfere with its usefulness, a less amount of it might be preferable. This quantity change however could not materially affect the general trend of the decomposition, for instead of any reaction consuming carbomonophenylimide in conjunction with aniline to produce carbodiphenylimide, the carbomonophenylimide could combine direct with the carbodiphenylimide from the triphenylguanidine.

The less amount of ammonia split off in the disassociation of the monophenylguanidine then, would merely lessen the quantity of intermediate diphenylguanidine formed (from combination with carbodiphenylimide), but not substantially affect the combination of the carbo-phenylimides with each other.

Even an excess of carbodiphenylimide could combine with such nascent ammonia as there was, to form diphenylguanidine, then emerge from the diphenylguanidine, under decomposition, as carbomonophenylimide, and so readily aid in readjusting the reactions to a suitable equilibrium again so that the path of normal decomposition could be largely followed.

In combining these two phenylguanidines, a mechanical mixture of them well stirred together before use would seem to be the simplest way to utilize them.

However, they may be melted together by heat, or found together with their by-products or decomposition products, due to manufacture, or the decomposition products of one may be added to the other or to the decomposition products of the other, or either may be added separately to the rubber mix, or the decomposition products of either may be added separately to the rubber mix.

Any of these means, or any other means for effecting a combined activity of these two phenylguanidines themselves, or of their decomposition products, or the introduction into a vulcanization of the carbo-phenylimides (as easy to obtain or to make as these guanidines), either with or without aniline or the ammonia, or the presence of any products that would supply them in a manner to effect a similar reaction activity, or that would ultimately result in tetra-substituted-melamine as the end product, is intended to be covered by this specification.

While the above proportions may seem to be the most desirable, yet the proportions may be changed considerable to meet the various vulcanizing conditions.

These combinations of monophenylguanidine and triphenylguanidine, or mixtures of their equivalents as accelerators, appear then to derive much of their efficiency from the peculiar circumstance that the disassociation inter-reactions of the two guanidines cause the gradual formation, within the heated rubber, of nascent diphenylguanidine as an intermediate.

This intermediate diphenylguanidine forms then while the disassociation end products are also forming, and the intermediate or nascent diphenylguanidine is capable of great activity, as it breaks up however, it follows the usual disassociation course that leads to ultimate tetraphenylmelamine.

Combinations of mono- and tri-substituted guanidines, homologous to these phenyl substituted guanidines, show much the same reaction behavior under vulcanizing temperatures.

My invention then consists in making use of these two substituted guanidines in a new manner, that initiates quite new and different reactions between them during rubber vulcanization, and that greatly accelerates the vulcanization of the rubber in which they are employed, and also gives resultant products that are highly improved from their use.

It is to be understood that I do not limit myself to the ingredients, components and proportions, given in this specification, or to such examples as have been cited by me, it being readily understood by those well versed in the art, that said ingredients, components and proportions may be varied within comparatively wide limits without departing from the principles and purposes of my invention as herein set forth.

It is further to be understood that my invention is not to be construed as dependent on the accuracy or soundness of any of the theories herein expressed.

Having now described my invention and having shown in what manner the same may be utilized, what I claim as new, and desire to secure by Letters Patent is:

1. A process of vulcanizing rubber which consists in, incorporating into rubber an accelerator comprising the combination of monophenylguanidine and triphenylguanidine, then heating the resultant rubber mixture with a vulcanizing agent to effect vulcanization.

2. A process of vulcanizing rubber which consists in, incorporating into rubber an accelerator comprising the combination of a mono-substituted-guanidine with a tri-substituted-guanidine, then heating the resultant rubber mixture with a vulcanizing agent to effect vulcanization.

3. A process of vulcanizing rubber which consists in, incorporating into compounded rubber an accelerator comprising the combination of a mono-substituted guanidine, a tri-substituted guanidine, and ammonia, then heating the resultant rubber mixture with a vulcanizing agent to effect vulcanization.

4. A process of vulcanizing rubber which consists in, incorporating into rubber an accelerator comprising the combination of a mono-substituted-guanidine, a tri-substituted-guanidine, and aniline or one of its homologues, then heating the resultant rubber mixture with a vulcanizing agent to effect vulcanization.

5. A process of vulcanizing rubber which consists in, incorporating into rubber an accelerator comprising a combination of a mono-substituted-guanidine, a tri-substituted-guanidine, aniline or one of its homologues, and ammonia, then heating the resultant rubber mixture with a vulcanizing agent to effect vulcanization.

6. A process of vulcanizing rubber which consists in, incorporating a vulcanizing agent with rubber, then applying heat and effecting an accelerated vulcanization through the presence of monophenylguanidine and triphenylguanidine in the rubber mixture.

7. A process of vulcanizing rubber which consists in, incorporating a vulcanizing agent with rubber, then applying heat and effecting an accelerated vulcanization through the presence of a mono-substituted-guanidine and a tri-substituted-guanidine in the rubber mixture.

8. A process of vulcanizing rubber which consists in, incorporating a vulcanizing agent with rubber, then applying heat and effecting an accelerated vulcanization through the presence of a mono-substituted-guanidine, a tri-substitutedguanidine and aniline or one of its homologues in the rubber mixture.

9. A process of vulcanizing rubber which consists in, incorporating a vulcanizing agent with compounded rubber, then applying heat and effecting an accelerated vulcanization through the presence of a mono-substituted guanidine, a tri-substituted guanidine, and ammonia, in the rubber mixture.

10. A process of vulcanizing rubber which consists in incorporating a vulcanizing agent with rubber, then applying heat and effecting an accelerated vulcanization through the presence of a mono-substituted-guanidine, a tri-substituted-guanidine, aniline or one of its homologues, and ammonia in the rubber mixture.

11. A process of vulcanizing rubber which consists in, incorporating with compounded rubber a vulcanizing agent, and mono-phenylguanidine and tri-phenylguanidine as an aid to vulcanization, then under heat inducing a decomposition of the two phenyl-guanidines in the rubber mixture, while effecting an accelerated vulcanization.

12. A vulcanized compound derived from, compounded rubber or similar material combined with a vulcanizing agent and an accelerator comprising monophenylguanidine and triphenylguanidine.

13. A vulcanized compound derived from, compounded rubber or similar material combined with a vulcanizing agent and an accelerator comprising mono-substituted guanidine and tri-substituted guanidine.

14. A vulcanized compound derived from, compounded rubber or similar material combined with a vulcanizing agent and an accelerator comprising mono-substituted guanidine, tri-substituted guanidine, and aniline or one of its homologues.

15. A vulcanized compound derived from, compounded rubber or similar material combined with a vulcanizing agent and an accelerator comprising mono-substituted guanidine, tri-substituted guanidine, ammonia, and aniline or one of its homologues.

GEORGE H. STEVENS.